United States Patent [19]

Tabota

[11] Patent Number: 4,953,410

[45] Date of Patent: Sep. 4, 1990

[54] PRESSURE DISTRIBUTION DETECTING DEVICE

[75] Inventor: Jun Tabota, Kyoto, Japan

[73] Assignee: Murata Manufacturing Co., Ltd., Japan

[21] Appl. No.: 398,741

[22] Filed: Aug. 25, 1989

[30] Foreign Application Priority Data

Aug. 25, 1988 [JP] Japan .................. 63-211718

[51] Int. Cl.⁵ ............................ G01L 1/22; G01L 5/16
[52] U.S. Cl. .............................. 73/862.04; 73/862.67
[58] Field of Search ............... 73/862.04, 172, 862.38, 73/862.54, 862.62, 862.65, 862.67; 128/782

[56] References Cited

U.S. PATENT DOCUMENTS 4,843,891 7/1989 Brunner et al. ............ 73/862.04

FOREIGN PATENT DOCUMENTS 0297735 12/1987 Japan .................. 73/862.04

*Primary Examiner*—Donald O. Woodiel
*Attorney, Agent, or Firm*—Ostrolenk, Faber, Gerb & Soffen

[57] ABSTRACT

A pressure distribution detecting device comprises a plurality of piezo-electric sensor elements arranged in a matrix for outputting voltages corresponding to pressure changes. A piezo-electric sensor element whose output voltage is to be read is sequentially selected through a control line so that when all the piezo-electric sensor elements are selected, selection through a control line is repeated. Output voltages of the piezo-electric sensor elements are read through reading lines and are then stored in a data processing device for each piezo-electric sensor element. In the data processing device, increment or decrement which is an output voltage corresponding to a pressure change in a sensor element is stored accumulatively, so that data concerning a pressure at a present time from an initiation of measurement can be obtained.

4 Claims, 4 Drawing Sheets

PRESSURE DISTRIBUTION DETECTING DEVICE

CROSS-REFERENCE TO RELATED APPLICATION

The present application relates to co-pending and commonly assigned U.S. patent application Ser. No. 07/398,742, filed Aug. 25, 1989, entitled "PIEZO-ELECTRIC TYPE OF PRESSURE SENSOR AND PRESSURE DETECTING DEVICE EMPLOYING THE SAME" by Jun Tabota.

BACKGROUND OF THE INVENTION

1. Field of the Invention

The present invention relates to a pressure distribution detecting device, and, more specifically, to a pressure distribution detecting device in which a plurality of piezo-electric sensor elements are arranged in a matrix to detect distribution of contact pressure.

2. Description of the Background Art

FIG. 7 shows a piezo-electric type of pressure distribution sensor in which piezo-electric elements are arranged in a matrix for detecting distribution of contact pressure such sensor is disclosed in Japanese Patent Laying Open No. 62-297735. Referring to FIG. 7, a plurality of piezo-electric elements are arranged in a matrix of 5 rows and 5 columns. Each of connection lines $A_1$ through $A_5$ disposed in each row is electically connected to upper electrodes 101 of the respective piezo-electric elements 1 in each row, and each of connection lines $B_1$ through $B_5$ disposed in each column is electrically connected to lower electrodes 102 in each column. If a pressure in a certain piezo-electric element 1a, for example, is to be measured in this piezo-electric type of pressure distribution sensor, a potential is measured through the connection lines $A_1$ and $B_1$ based on a distortion caused in the piezo-electric element 1a. Then, by sequentially changing combinations of connection lines, a potential generated in each piezo-electric element is measured to obtain a pressure distribution.

A piezo-electric element generates an electric charge immediately when external force is applied thereto. Therefore, once it produces an electric charge, a potential difference between electrodes is not generated unless pressure applied to the piezo-electric element changes. Accordingly, a conventional piezo-electric type of pressure distribution sensor can obtain a pressure distribution only at a single point in time through a single measurement, so that a sequential change of pressure distributions with time cannot be obtained.

SUMMARY OF THE INVENTION

An object of the present invention is to provide a pressure distribution detecting device that can measure a sequential change of a pressure distribution with time.

In order to achieve the above object, the pressure distribution device according to the present invention comprises a plurality of piezo-electric sensor elements arranged in a matrix for outputting a voltage corresponding to a pressure change; reading means for sequentially reading an output voltage from a plurality of piezo-electric sensor element; and accumulating means for accumulating an output voltage read out by the reading means for each piezo-electric sensor element.

According to the present invention, since the accumulating means accumulates voltage data corresponding to a pressure change with time for each piezo-electric sensor element caused, if a pressure does not change in each piezo-electric sensor element, constant data concerning pressure is obtained, and if the pressure changes, data concerning pressure at the time of the measurement is obtained. As a result, a sequential change of pressure distribution with time can be measured.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
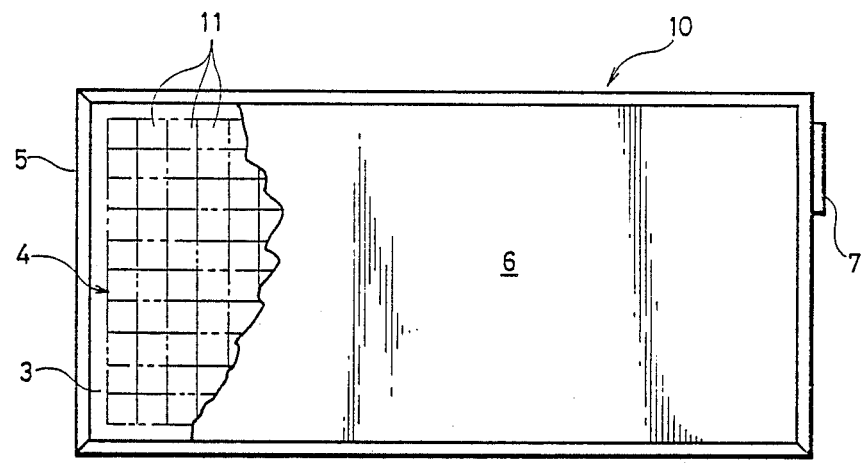
FIG. 2 is a plan view, partly in section, showing a piezo-electric type of pressure distribution sensor provided in a pressure distribution detecting device of one embodiment of the present invention.
Figure 3:
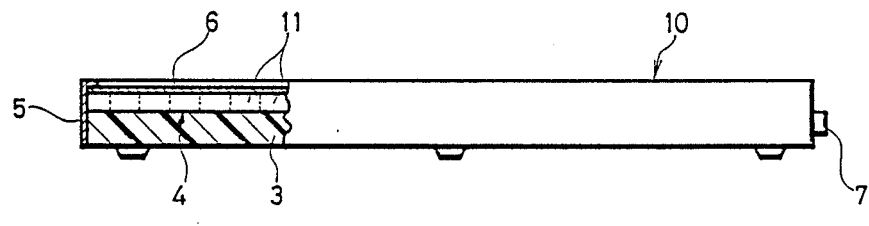
FIG. 3 is a side view, partly in section, showing the piezo-electric type of pressure distribution sensor shown in FIG. 2.

Referring to FIGS. 2 and 3, a piezo-electric type of pressure distribution sensor 10 comprises a support member 3. The support member 3 has a rectangular and flat upper surface, and is principally formed of bakelite; and a group of sensor elements 4 arranged in a matrix is fixed thereon. A detachable frame 5 is attached on the periphery of the support member 3. A pressure plate 6 is disposed in an opening of the frame 5. The pressure plate is flexible so as to press upper surfaces of the group of sensor elements 4, and a periphery of the pressure plate 6 is fixed to the frame 5. An input/output connector 7 is provided on one end of a longitudinal direction of the pressure distribution sensor 10.

Figure 4:
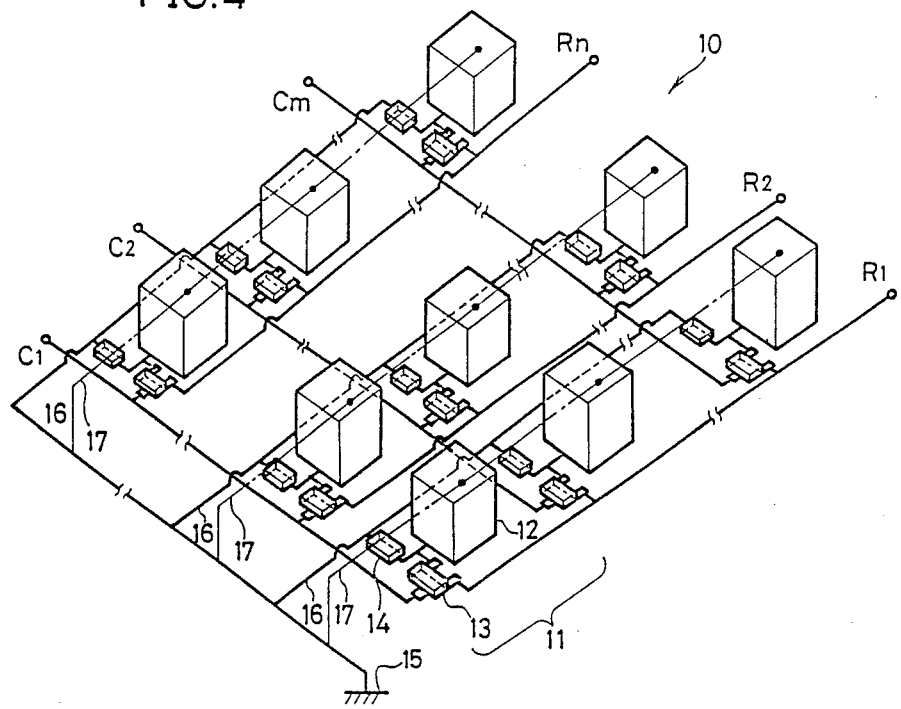
FIG. 4 is a block diagram showing an electrical structure of the piezo-electric type of pressure distribution sensor shown in FIGS. 2 and 3.

The group of sensor elements 4 are formed of a plurality of respective sensor elements 11, each sensor element comprising, as shown in FIG. 4, a piezo-electric element 12, a field effect transistor 13, and a capacitor 14. Corresponding to the sensor elements 11 being arranged in a matrix of rows and columns, each of control lines $C_1, C_2, \ldots C_m$ (FIG. 4) is disposed in each row, while each of reading lines $R_1, R_2, \ldots R_n$ is disposed in each column. In addition, two connecting lines 16 and 17 connected to a ground 15 are disposed in each column.

Figure 5:
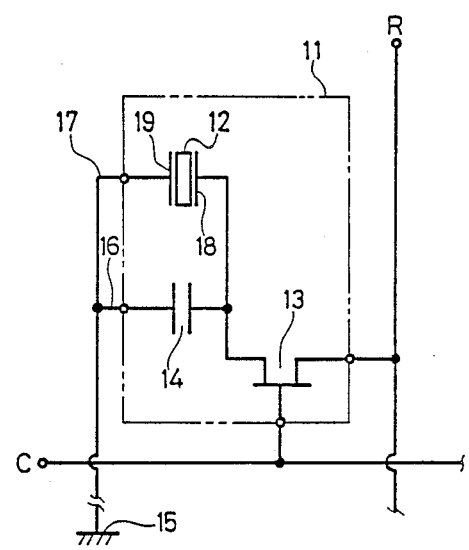
FIG. 5 is an equivalent circuit diagram of sensor elements forming the piezo-electric type of pressure distribution sensor shown in FIG. 4.

FIG. 5 shows an equivalent circuit of one of sensor elements 11. In FIG. 5, a gate electrode of the field effect transistor 13 is connected to a control line C.

Either one of source or drain electrode of the transistor 13 is connected to a reading line R, and the other of the source or the drain electrode is connected to an electrode 18 formed on one side of a piezo-electric element 12. An electrode 19 formed on the other side of the piezo-electric element 12 is connected to a connecting line 17 leading to a ground 15. A capacitor 14 is connected between the electrode 18 on one side of the piezo-electric element 12 and a connecting line 16 leading to the ground 15. More specifically, the capacitor 14 is connected in parallel with the piezo-electric element 12. The piezo-electric element 12 comprises an element formed of piezo-electric materials having high rigidity, such as piezo-electric ceramics and piezo-electric monocrystal.

Figure 6:
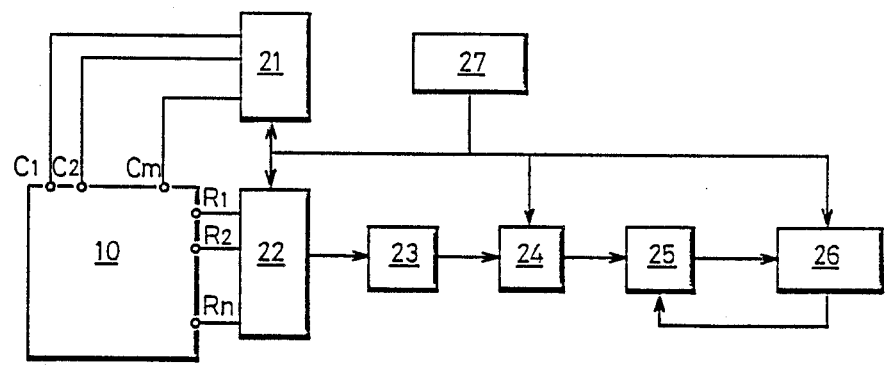
FIG. 6 is a schematic block diagram showing an entire structure of a pressure distribution detecting device of one embodiment of the present invention.
Figure 7:
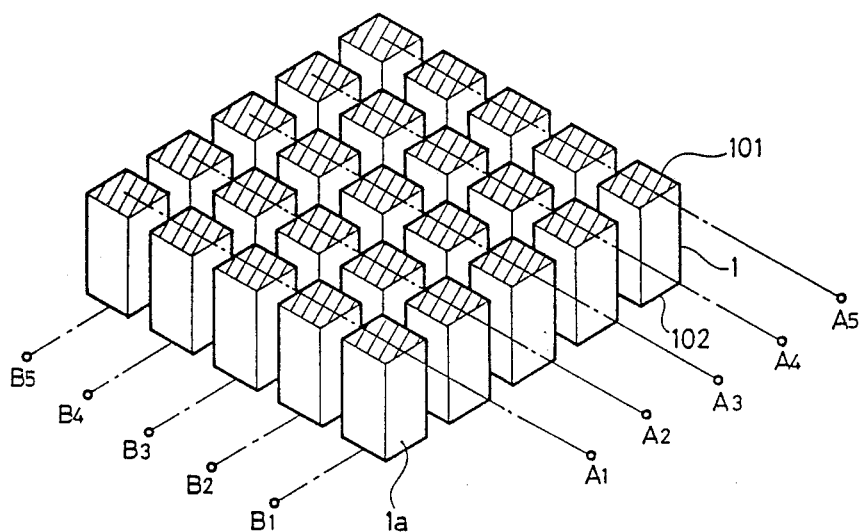
FIG. 7 is a perspective view showing a piezo-electric type of pressure sensor of the background of the present invention.

The above-described piezo-electric type of pressure sensor 10 is incorporated in, for example, a pressure distribution detecting device as shown in FIG. 6.

In FIG. 6, control lines $C_1$, $C_2$..., $C_m$ of the piezo-electric type of pressure sensor 10 are connected to a control line switching circuit 21, while reading lines $R_1$, $R_2$, ... $R_n$ are connected to a reading line switching circuit 22. The reading line switching circuit 22 is connected to an integrating circuit 23, which is connected to a peak hold circuit 24. The peak hold circuit 24 is connected to a data processing device 26 through an A/D converter 25. In addition, the detecting device of FIG. 6 comprises a matrix control circuit 27. The matrix control circuit 27 controls the control line switching circuit 21 and the reading line switching circuit 22, and transmits a reset signal to the peak hold circuit 24 at a predetermined timing and an element-switching information signal to the data processing device 26. The data processing device 26 transmits to the A/D converter 25 a control signal for controlling the A/D converter 25.

Now, an operation of the piezo-electric type of pressure sensor incorporated in the pressure distribution detecting device of FIG. 6 is desired.

The transistors 13 connected to the control line $C_1$ are rendered conductive by means of the matrix control circuit 27 through the control line switching circuit 21. At this time, the other control lines $C_2$, $C_3$, ... $C_m$ are non-conductive. As a result, charge generated by pressure in the sensor elements in a row corresponding to the control line $C_1$ becomes readable through the reading lines $R_1$, $R_2$, ... $R_n$.

In this state, first of all, only the reading line R1 is connected to the integrated circuit 23 by means of the reading line switching circuit 22. At this time, the remaining reading lines $R2_2$, $R_3$, ... $R_n$ are open-circuited, so that information in the sensor elements corresponding to the lines $R_2$, $R_3$ ... $R_n$ is held.

When the reading line $R_1$ is connected to the integrating circuit 23 (FIG. 6) charge in a piezo-electric element selected by the control line $C_1$ is discharged to the integrating circuit 23. If the discharged charge is temporally integrated in the integrated circuit 23, the amount of charge generated by a pressure in the sensor element can be measured; and such measurement is inputted into the data processing device 26 through the peak hold circuit 24 and the A/D converter 25 in a later stage.

Thereafter, each of the reading lines $R_2$, $R_3$, ... $R_n$ is switched until finishing detection through all the reading lines, is finished, and then only the control line $C_2$ is rendered conductive, whereby, similar to the above operation, reading information of each sensor element arranged in a row corresponding to the control line $C_2$ is read through the reading lines $R_1$, $R_2$, ... $R_n$ to be stored in the data processing device.

More specifically, in the above-described pressure distribution detecting device, when an unknown object presses upper surfaces of the respective piezo-electric elements 12, the pressure applied by the object causes piezo-electric effects in the corresponding piezo-electric elements 12, so that pressures on respective sensor elements can be detected by sequentially switching the control lines $C_1$, $C_2$, ... $C_m$ and the reading lines $R_1$, $R_2$, ... $R_n$. Accordingly, a pressure distribution based on the unknown object pressing the piezo-electric type of pressure sensor 10 can be detected.

Detection of the pressure of each sensor element is repeated. More specifically, when pressures of all the sensor elements are detected, the first sensor element is again selected so that its pressure is detected, and thereafter, each sensor element is sequentially selected as described above, so that its pressure is detected. The operation is repeated until the measurement is finished.

Now, an operation of the data processing device shown in FIG. 6 is described.

A charge corresponding to a pressure change is stored in the capacitor 14 (FIG. 5) of the sensor element 11. Assuming that a voltage corresponding to a charge read out from the sensor element 11 (i.e., that is, a voltage of an output terminal of the A/D converter 25) is represented by V, the relation $$P = kV \qquad \ldots (1)$$

is obtained due to an inverse piezo-electric effect, wherein P is pressure and k is a constant of proportion.

Now, if a charge is read out from a sensor element every $\Delta t$ in succession, a sensor element is reset at every reading, so that charges corresponding to the amount of the subsequent pressure changes are stored. Accordingly, assuming that $t = \Delta t \cdot n$, a pressure P (t) which is obtained after a time t from initiation of measurement is represented by the following equation:

$$P(t) = k \sum_{i=1}^{n} V(i) \qquad (2)$$

wherein V (i) is a i-th voltage as measured.

As described in the foregoing, by accumulating measured voltages at every measurement, pressures can be measured in succession.

Figure 1:
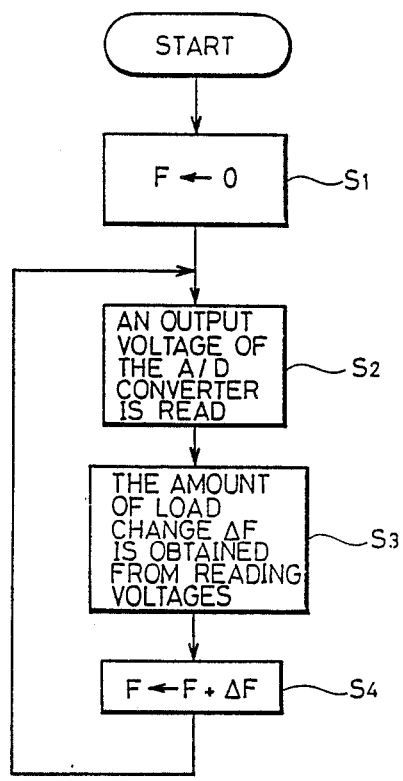
FIG. 1 is a flow chart for explaining an operation of a data processing device provided in a pressure distribution detecting device of one embodiment of the present invention.

Referring to FIG. 1, in the step S1, a load value F of each sensor element is reset to 0 at the beginning of measurement. Then, in the step s2, outputs from the sensor elements, that is, an output voltage of the A/D converter, is read. If this is the first reading, a voltage value corresponding to the amount of voltage change from its resetting time is read, and if the reading is the second or subsequent reading, a voltage value corresponding to the amount of voltage change from the previous reading is read. The peak hold circuit 24 shown in FIG. 6 holds a peak value of both of positive and negative voltages. Subsequently, in the step S3, the amount of load change $\Delta f$ is obtained from reading voltages. For example, if a charge amount is increased, a pressure value is increased, and inversely, if a charge amount is decreased, a pressure value is decreased. More specifically, $\Delta f$ has both of signs of plus and minus. Subsequently, in the step S4, the obtained $\Delta f$ is accumulated. In this way, each step from a reading of sensor to calculating is repeated every predetermined time interval ΔT to obtain a present load value.

Although the flow chart shown in FIG. 1 shows an operation of a sensor element, in the data processing device, a register or a storage area corresponding to each sensor element is provided for accumulating an output value of each sensor element in either the register or the storage area. In this way, the detecting device can detect a sequential change of pressure distributions.

Switching order of control lines and reading lines is not limited to the above order, but any switching order may be possible. In addition, when the number of reading lines is not too large, integrating circuits and peak hold circuits may be provided at respective reading lines.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pressure distribution detecting device, comprising:
    a plurality of piezo-electric sensor elements arranged in a matrix for outputting voltages corresponding to pressure changes;
    reading means for sequentially reading output voltages from said plurality of piezo-electric sensor elements; and
    accumulating means for accumulating output voltages read by said reading means for each piezo-electric sensor element.

2. A pressure distribution detecting device according to claim 1, wherein
    each of said plurality of piezo-electric sensor elements is formed of a piezo-electric ceramic material having high rigidity.

3. A pressure distribution detecting device according to claim 1, wherein each of said plurality of piezo-electric sensor elements is formed of a piezo-electric monocrystal material having high rigidity.

4. A pressure distribution detecting device, comprising:
    a plurality of piezo-electric sensor elements arranged in a first direction and a second direction intersecting therewith;
    each of said piezo-electric sensor elements comprising a piezo-electric element for outputting a voltage corresponding to a pressure change, and switching means connected to said piezo-electric element;
    a plurality of control lines extending in said first direction for rendering said switching means conductive;
    a plurality of reading lines extending in said second direction and connected to said switching means for reading an output voltage of said piezo-electric element;
    selecting means for selecting a piezo-electric element whose output voltage is to be read by controlling said plurality of control lines; and
    accumulating means for accumulating an output voltage read from a piezo-electric element selected by said selecting means through a reading line;
    said accumulating means accumulating an increment or decrement of an output voltage in each piezo-electric element.

* * * * *